United States Patent [19]

Matsufuji et al.

[11] 4,431,712
[45] Feb. 14, 1984

[54] MAGNETIC RECORDING MEDIUM OF FERROMAGNETIC PARTICLES AND BINDER

[75] Inventors: Akihiro Matsufuji; Akira Kasuga; Hajime Miyatsuka; Masashi Aonuma, all of Odawara, Japan

[73] Assignee: Fuji Photo Film Co., Ltd., Kanagawa, Japan

[21] Appl. No.: 347,619

[22] Filed: Feb. 10, 1982

[30] Foreign Application Priority Data

Feb. 10, 1981 [JP] Japan .................. 56-18506

[51] Int. Cl.$^3$ .............................. B37B 27/40
[52] U.S. Cl. .................. 428/692; 428/694; 428/702; 428/900
[58] Field of Search ............ 428/900, 692, 694, 702

[56] References Cited

U.S. PATENT DOCUMENTS 4,289,828  9/1981  Ota et al. .................. 428/900

*Primary Examiner*—Marion McCamish
*Attorney, Agent, or Firm*—Sughrue, Mion, Zinn, Macpeak & Seas

[57] ABSTRACT

A magnetic recording medium having a non-magnetic base overlaid with a magnetic layer containing ferromagnetic particles and a binder is disclosed. The ferromagnetic particles are metal particles and the binder is composed of (a) carboxyl-containing vinyl chloride/vinyl acetate copolymer, (b) a polyurethane resin and (c) a polyisocyanate compound.

6 Claims, No Drawings

MAGNETIC RECORDING MEDIUM OF FERROMAGNETIC PARTICLES AND BINDER

FIELD OF THE INVENTION

This invention relates to a magnetic recording medium, and more particularly, to the composition of a binder effective for use in combination with ferromagnetic metal particles. Still more particularly, the invention relates to a magnetic recording medium having an improved dispersion of ferromagnetic metal particles and hence good operating characteristics.

BACKGROUND OF THE INVENTION

A magnetic recording medium basically consists of a non-magnetic base made of a material such as a polyester film, and an overlying magnetic layer principally made of ferromagnetic particles and a binder. Today, ferromagnetic metal particles having high saturation magnetization and coercive force are used for the purpose of providing increased magnetic recording density and reproduction output. Ferromagnetic metal particles have good magnetic properties, but because of their high saturation magnetization ($\sigma$s), the interaction between the individual particles is great, a dispersion of the particles is not easily formed, and a dispersion once formed does not remain stable for a sufficient period of time. As a further disadvantage, ferromagnetic metal particles of this type are inherently easily oxidized, so their magnetic properties are more easily impaired with time than oxide magnetic particles. For a magnetic layer containing ferromagnetic metal particles, improvement in the recording density is given the top priority, so the need for shorter recording wavelength and smaller loss in spacing with the head unavoidably requires a smoother tape surface than that of a magnetic layer containing oxide magnetic particles. However, as the tape surface is made smoother, the area of contact with the tape transport system increases and hence the friction coefficient is increased, whereas the durability of the tape is decreased. Because of these disadvantages, the magnetic recording medium obtained often has poor magnetic properties and electro-magnetic conversion characteristics, as well as poor running property and low durability.

Conventionally known vinyl chloride/vinyl acetate resins, polyurethane resins, cellulosic resins, polyester resins and mixtures thereof form a good dispersion of magnetic particles and can be stored for an extended period, as disclosed in Japanese Patent Publication Nos. 19282/64, 5349/65 and 22063/72, and Japanese Patent Application (OPI) Nos. 51704/78, 51705/78, 51706/78, 51707/78, 51708/78 and 84705/79 (the term "OPI" as used herein refers to a "published unexamined Japanese patent application"). However, they do not always have satisfactory running property and durability.

SUMMARY OF THE INVENTION

Therefore, one object of this invention is to provide a novel magnetic recording medium.

Another object of the invention is to provide a magnetic recording medium having good magnetic properties.

A further object of the invention is to provide a magnetic recording medium having good running property.

A still further object of the invention is to provide a magnetic recording medium having great durability.

Still another object of the invention is to provide a magnetic recording medium whose characteristics are not greatly changed with time.

As mentioned above, vinyl chloride/vinyl acetate resins form a good dispersion of magnetic particles and can be stored for an extended period. Therefore, using these resins, various studies were made to provide a magnetic recording medium having improved running property and durability without reducing its magnetic properties and electro-to-magnetic conversion properties. As a result, it has been found that the desired magnetic recording medium can be produced by using a binder composed of (a) a carboxyl-containing vinyl chloride/vinyl acetate copolymer, (b) a polyurethane resin, and (c) a polyisocyanate compound. Therefore, this invention provides a magnetic recording medium having a non-magnetic base overlaid with a magnetic layer mainly comprising ferromagnetic metal particles and a binder which comprises (a) a carboxyl-containing vinyl chloride/vinyl acetate copolymer, (b) a polyurethane resin and (c) a polyisocyanate compound.

DETAILED DESCRIPTION OF THE INVENTION

The carboxyl-containing vinyl chloride/vinyl acetate copolymer used in this invention is a copolymer of vinyl chloride, vinyl acetate and a polymerizable unsaturated carboxylic acid. Examples of the polymerizable unsaturated carboxylic acid include acrylic acid, methacrylic acid, crotonic acid, isocrotonic acid and maleic acid.

The copolymerization ratio of the component (a) is 80-95:3-20:1-5 for vinyl chloride:vinyl acetate:polymerizable unsaturated carboxylic acid.

Examples of the polyurethane resin used in this invention include polyester polyurethane resins produced by the reaction of polyester polyols or lactone polyester polyols produced from lactones (e.g., $\epsilon$-caprolactone and $\gamma$-butyrolactone) with diisocyanate compounds, and polyether polyurethane resins produced by the reaction of polyether polyols derived from ethylene oxide, propylene oxide or butylene oxide with diisocyanate compounds. The polyester polyols are produced by reacting organic dibasic acids such as saturated or unsaturated dicarboxylic acids (e.g., maleic acid and adipic acid), alicyclic dicarboxylic acids (e.g., norbornene dicarboxylic acid) or aromatic dicarboxylic acids (e.g., phthalic acid) with one or more polyols selected from glycols (e.g., ethylene glycol, propylene glycol, diethylene glycol and polyethylene glycol), polyvalent alcohols (e.g., trimethylolpropane, hexanetriol, glycerine and pentaerythritol) and polyvalent phenols (e.g., hydroquinone and bisphenol A). Examples of the diisocyanate compounds include aromatic diisocyanates (e.g., tolylene diisocyanate, xylylene diisocyanate and 4,4'-diphenylmethane diisocyanate) and aliphatic diisocyanates (e.g., hexamethylene diisocyanate). These polyurethane resins may be terminated with an isocyanate group, hydroxyl group or carboxyl group or mixtures thereof. The polyurethane resins have a molecular weight of from 10,000 to 200,000.

The weight ratio of the carboxyl-containing vinyl chloride/vinyl acetate copolymer to the polyurethane resin is from 85:15 to 10:90, preferably from 70:30 to 50:50. A binder containing too much carboxyl-containing vinyl chloride/vinyl acetate copolymer forms a brittle magnetic layer that is not firmly adhered to the non-magnetic base. A binder containing too much polyurethane resin forms a poor dispersion of magnetic particles and hence provides a magnetic layer that has poor surface quality and low S/N ratio.

Examples of the polyisocyanate compound are an adduct of 3 mols of a diisocyanate compound such as tolylene diisocyanate and 1 mol of a trivalent polyol such as trimethylolpropane; a trimer of tolylene diisocyanate; and polyisocyanate and polyphenylmethane polyisocyanate. The weight ratio of the polyisocyanate compound to the sum of the carboxyl-containing vinyl chloride/vinyl acetate copolymer and the polyurethane resin can vary within the range of from 40:60 to 10:90.

The ferromagnetic metal particles used in this invention mainly consist of iron-cobalt or iron-nickel-cobalt, and they can be prepared by any of the following non-limiting methods:

(1) an organic acid salt of ferromagnetic metal is hydrolyzed and then reduced with a reducing gas;
p1 (2) an acicular oxyhydroxide of a ferromagnetic metal, an acicular oxyhydroxide of a ferromagnetic metal and another metal, or acicular iron oxide derived from these oxyhydroxides is reduced;
(3) a ferromagnetic matal is vaporized in a low-pressure inert gas;
(4) a metal carbonyl compound is thermally decomposed;
(5) particles of a ferromagnetic metal are electrodeposited on a mercury cathode from which the particles are then separated; and
(6) a metal salt capable of forming a ferromagnetic material in aqueous solution is reduced with a reducing material (e.g., borohydride compound, hypophosphite or hydrazine) to form ferromagnetic particles.

The ferromagnetic metal particles produced by the methods (2), (3) and (6) are particularly preferred because they have good stability against oxidation, as well as good magnetic properties and electro-to-magnetic conversion characteristics and they achieve good results in the magnetic recording medium of this invention.

The resulting ferromagnetic metal particles may be provided with an oxide coating to improve their chemical stability, as described in Japanese Patent Publication Nos. 3862/60 and 11724/81 and Japanese Patent Application (OPI) Nos. 54998/77, 85054/77 and 30707/81.

The ferromagnetic metal particles and the binder are blended with dispersants, lubricants, abrasives, antistats and a coating solvent to obtain a magnetic paint for application onto the non-magnetic base. The coating solvent is an organic solvent examples of which include ketones such as methyl ethyl ketone and cyclohexanone, alcohols, esters such as ethyl acetate and butyl acetate, cellosolves, ethers, aromatic solvents such as toluene, and chlorinated hydrocarbon solvents such as carbon tetrachloride and chloroform.

Specific examples of dispersants which can be employed in the magnetic recording layer in accordance with this invention are aliphatic carboxylic acids having 12 to 18 carbon atoms (e.g., of the formula $R_1COOH$, wherein $R_1$ is an alkyl or alkenyl group having 11 to 17 carbon atoms) such as caprylic acid, capric acid, lauric acid, myristic acid palmitic acid, stearic acid, oleic acid, elaidic acid, linolic acid, linoelic acid, stearolic acid, and the like; metallic soaps comprising alkali metal (Li, Na, K, etc.) or alkaline earth metal (Mg, Ca, Ba, etc.) salts of the above-described aliphatic carboxylic acids; fluorine-containing compounds of the above-described aliphatic carboxylic acid esters; amides of the above-described aliphatic carboxylic acids; polyalkylene oxide alkyl phosphates; lecithin; trialkyl polyolefinoxy quaternary ammonium salts (wherein the alkyl group has 1 to 5 carbon atoms, and the olefin is exemplified by ethylene, propylene, etc.); and the like. In addition, higher alcohols having more than 12 carbon atoms and the sulfuric acid esters thereof and the like can also be employed. These dispersants are employed in an amount of from about 0.5 to about 20 parts by weight per 100 parts by weight of the binder. These dispersants are described in detail in Japanese Patent Publication Nos. 28369/64, 17945/69, 7441/73, 15001/73, 15002/73, 16363/73 and 4121/75, U.S. Patents 3,387,993 and 3,470,021, etc.

Typical lubricants which can be employed in the magnetic recording layer in accordance with this invention include finely divided electrically conductive powders such as graphite, etc.; finely divided inorganic powders such as molybdenum disulfide, tungsten disulfide and the like; finely divided synthetic resin powders such as those of polyethylene, polypropylene, polyethylenevinyl chloride copolymers, polytetrafluoroethylene and the like; $\alpha$-olefin polymers; unsaturated aliphatic hydrocarbons which are liquid at normal temperature (compounds in which an n-olefin double bond is positioned at the terminal thereof, with about 5 to about 20 carbon atoms); aliphatic acid esters of aliphatic monocarboxylic acids having 12 to 20 carbon atoms and monovalent alcohols having 3 to 12 carbon atoms, and the like. These lubricants can be employed at about 0.2 to about 20 parts by weight per 100 parts by weight of the binder, and are described in detail in Japanese Patent Publication Nos. 18064/66, 23889/68, 40461/71, 15621/72, 18482/72, 28043/72, 32001/72 and 5042/75, U.S. Pat. Nos. 3,470,021, 3,492,235, 3,497,411, 3,523,086, 3,625,760, 3,630,772 and 3,642,539, *IBM Technical Disclosure Bulletin*, Vol. 9, No. 7, page 779 (December, 1966), *ELEKTRONIK*, 1961, No. 12, page 380, etc.

Specific examples of abrasives which can be employed in the magnetic recording layer in accordance with this invention are those generally employed which include fused alumina, silicon carbide, chromium dioxide, corundum, artificial corundum, diamond, artificial diamond, garnet, emery (with the main components being corundum and magnetite), and the like. These abrasives have a Mohs' hardness above about 5. Preferably the abrasives employed have an average particle size of about 0.05 to about 5$\mu$, more preferably 0.1 to 2$\mu$. These abrasives are employed in an amount of about 0.5 to about 20 parts by weight per 100 parts of the binder. These abrasives are described in detail in Japanese Patent Publication Nos. 18572/72, 15003/73, 15004/73 (corresponding to U.S. Patent No. 3,617,378), 39402/74 and 9401/75, U.S. Pat. Nos. 3,007,807, 3,041,196, 3,293,066, 3,630,910 and 3,687,725, British Pat. No. 1,145,349, German Patent Application (DT-PS) Nos. 853,211 and 1,101,000, and the like.

Typical examples of antistats which can be employed in the magnetic recording layer in accordance with this invention include finely divided electrically conductive powders such as carbon black, carbon black graft polymers and the like; natural surface active agents such as saponin, etc.; nonionic surface active agents such as alkylene oxide type, glycerin type, glycidol type and like surface active agents; cationic surface active agents such as higher alkyl amines, quaternary ammonium salts, pyridines or other heterocyclic compounds, phosphoniums or sulfoniums and the like; anionic surface active agents containing an acidic group derived from a carboxylic acid group, a sulfonic acid group or a phosphoric acid group, a sulfuric acid ester group, a phosphoric acid ester group and the like; amphoteric surface active agents such as sulfuric acid esters or phosphoric acid esters, etc., of amino acids, aminosulfonic acids, amino alcohols and the like.

The above-described finely divided electrically conductive powders can be employed in an amount of about 0.2 to about 20 parts by weight per 100 parts of the binder, and the surface active agents can be used in an amount of from about 0.1 to about 10 parts by weight per 100 parts by weight of the binder.

These electrically conductive finely divided powders which can be employed as antistats and some surface active agents are described in Japanese Patent Publication Nos. 22726/71, 24881/72, 26882/72, 15440/73 and 26761/73, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, German Patent Application (OLS) No. 1,942,665, British Pat. Nos. 1,077,317 and 1,198,450, etc., and in references such as Ryohei Oda, et al., *Kaimen Kassezai no Gosei to sono Oyo (Synthesis and Application of Surface Active Agents)*, published by Maki Shoten, Tokyo (1964), A. M. Schwartz and J. W. Perry, *Surface Active Agents*, published by Interscience Publications Inc. (1958), J. P. Sisley, *Encyclopedia of Surface Active Agents*, Vol. 2, published by Chemical Publishing Co. (1964), *Kaimen Kasseizai Binran* (Handbook of Surface Active Agents), Sixth Ed., published by Sangyo Tosho Kabushiki Kaisha, Japan (Dec. 20, 1966) etc.

The non-magnetic base may be made of a synthetic resin (e.g., polyester, polyamide, polyolefin, cellulose derivative), non-magnetic metal, glass, ceramics and paper. The base is used in the form of a film, tape, sheet, card, disc, drum or any other suitable form, but it is generally used in the form of a tape or sheet.

The magnetic paint is prepared by charging a mixer with the magnetic particles and all other ingredients simultaneously or sequentially. Various mixers may be used to achieve thorough mixing of the ingredients. For details of the mixers, see T. C. Patton, *Paint Flow and Pigment Dispersion*, John Wiley & Sons, 1964. A magnetic layer is formed from the magnetic paint on the base by various methods that are specifically described in *Coating Kogaku (Coating Engineering)*, published by Asakura Shoten, 1971. The magnetic layer thus-formed on the base is dried after the magnetic particles in the layer are optionally oriented. The magnetic layer may be passed through a smoothing step for improving its magnetic properties (e.g., smoothing before drying or calendering after drying).

This invention is now described in greater detail by reference to the following example and comparative examples which are given here for illustrative purposes only and are by no means intended to limit the scope of the invention. In the examples, all parts are by weight.

EXAMPLE 1

Acicular particles of $\alpha$-FeOOH containing 5 wt% cobalt were decomposed with heat to produce $\alpha$-Fe$_2$O$_3$ particles which were reduced with hydrogen to form ferromagnetic metal particles. The particles had a coercive force (Hc) of 1,400 Oe, a saturation magnetization ($\sigma$s) of 150 emu/g and a squareness ratio ($\sigma$s/$\sigma$r) of 0.52.

Three hundred parts of the ferromagnetic metal particles and a composition having the following formulation were placed in a ball mill where they were mixed thoroughly for 48 hours.

|  | parts |
|---|---|
| Maleic acid-containing vinyl chloride/vinyl acetate copolymer (degree of polymerization: ca. 400, vinyl chloride/vinyl acetate/ maleic acid ratio = 86/13/1) | 30 |
| Polyester polyurethane (reaction product of ethylene adipate and 2,4-tolylene diisocyanate, wt. av. m.w. for polystyrene: ca. 110,000) | 20 |
| Palmitic acid | 5 |
| Butyl stearate | 2 |
| Aluminum oxide ($\alpha$-Al$_2$O$_3$) | 6 |
| Butyl acetate | 500 |
| Methyl isobutyl ketone | 400 |

To the resulting dispersion, 25 parts of a 75 wt% ethyl acetate solution of a triisocyanate compound ("Desmodule L-75" of Bayer A. G., an adduct of 3 mols of tolylene diisocyanate and 1 mol of trimethylolpropane) was added, and the mixture was stirred by a high-speed disperser for 1 hour to provide a magnetic coating solution.

The coating solution was applied to one surface of a polyethylene terephthalate film, placed in a magnetic field for orientation, dried, calendered, and slit to form a magnetic video tape ½ inch wide.

COMPARATIVE EXAMPLE 1

A magnetic tape was produced as in Example 1 except that 20 parts of the polyurethane was replaced by 20 parts of a maleic acid-containing vinyl chloride/vinyl acetate copolymer.

COMPARATIVE EXAMPLE 2

A magnetic tape was produced as in Example 1 except that 25 parts of the ethyl acetate solution of triisocyanate compound was replaced by 15 parts of a maleic acid-containing vinyl chloride/vinyl acetate copolymer and 10 parts of polyurethane.

The squareness ratio, electro-to-magnetic conversion characteristics, time-dependent change in magnetic properties, still mode durability, stability to repeated running, and the friction coefficient of the three tapes are indicated in Table 1.

TABLE 1

| | Squareness Ratio[1] | Electro-to-Magnetic Conversion Properties[2] (output at 4 MHz) | Time-Dependent Change in Magnetic Properties[3] (percent demagnetization) | Still Mode Durability[4] | Stability to Repeated Running[5] | Friction Coefficient[6] |
|---|---|---|---|---|---|---|
| Example 1 | 0.84 | 8.0 dB | −5.0% | More than 90 minutes | 100 Passes or more (no damage) | 0.36 |
| Comparative Example 1 | 0.85 | 8.0 dB | −6.0% | 5 Minutes | 30–40 Passes (magnetic particles dislodged) | 0.35 |
| Comparative Example 2 | 0.84 | 7.8 dB | −6.0% | 30 Minutes | 10–20 Passes (foul head) | 0.40 |

[1]The Bm/Br value as measured by a vibrating flux meter (Model VSM-III of Toei Kogyo K.K.).
[2]The reproduction output as measured at 4 MHz by a VHS video tape recorder (Model NV-8800 of Matsushita Electric Industrial Co., Ltd.) whose record/reproduce head was especially made of "Sendust" (alloy). As a reference tape, Fuji Video Cassette T-120E of Fuji Photo Film Co., Ltd. was used.
[3]Percent reduction of the saturation flux density (Bm) of the tape exposed to 60° C. and 90% RH for 10 days.
[4]In a still mode, the rotary video head of the VTR of [2] was rotated in contact with the same area of a standing tape. The time for the output reproduced from the recorded signal by the video head to be reduced to substantially zero as a result of tape abrasion was measured.
[5]A given length of tape (e.g., 10 m) was threaded in a VHS cassette half, and a predetermined signal was recorded on the tape and repeatedly reproduced with a VHS video tape recorder, and the resulting tape damage was checked.
[6]The friction coefficient as measured at 25° C. and 65% RH when the tape was caused to run in contact with a stainless steel pole (surface roughness: 0.15μ, diameter: 5 mm) at an angle of 180° and at a speed of 3.3 cm/sec under a load of 50 g.

As is clear from Table 1, the tape of Example 1 had a squareness ratio, video output and percent demagnetization almost equal to those of the tapes of Comparative Examples 1 and 2, which indicates that the former was as good as the latter with respect to the dispersibility of magnetic particles, electro-to-magnetic conversion properties and long-term stability. As for the still mode durability and stability to repeated running, the tape of Example 1 was better than the tapes of Comparative Examples; magnetic particles were dislodged from the tape of Comparative Example 1 in the area of contact with the video head, and the sample of Comparative Example 2 fouled the video tape, but the tape of Example 1 could be passed through the VTR more than 100 times without causing these problems. The friction coefficient of the tape of Example 1 was equal to that of the tape of Comparative Example 1, but smaller than that of the tape of Comparative Example 2. These results show that the combination of the carboxyl-containing vinyl chloride/vinyl acetate copolymer of Example 1 with the polyurethane resin and polyisocyanate compound provides a more durable and runnable magnetic recording medium than the combination of said copolymer with either the polyurethane resin or polyisocyanate compound.

While the invention has been described in detail and with reference to specific embodiments thereof, it will be apparent to one skilled in the art that various changes and modifications can be made therein without departing from the spirit and scope thereof.

What is claimed is:
1. A magnetic recording medium, comprising: a non-magnetic support base; a magnetic layer overlaid on a surface of said non-magnetic support base, said magnetic layer comprising ferromagnetic particles and a binder, said ferromagnetic particles being metal particles and said binder comprising: (a) a copolymer of unsaturated carboxylic acid/vinyl chloride/vinyl acetate copolymer, (b) a polyurethane resin and (c) a polyisocyanate compound.

2. A magnetic recording medium as claimed in claim 1, wherein said component (a) is comprised of vinyl chloride:vinyl acetate:polymerizable unsaturated carboxylic acid, in a copolymerization ratio of 80–95:3–20:1–5, respectively.

3. A magnetic recording medium as claimed in claim 1, wherein said polyurethane resin has a molecular weight of from 10,000 to 200,000.

4. A magnetic recording medium as claimed in claim 1, wherein the weight ratio of (a) carboxyl-containing vinyl chloride/vinyl acetate copolymer to the (b) polyurethane resin is from 85:15 to 10:90.

5. A magnetic recording medium as claimed in claim 4, wherein said ratio is from 70:30 to 50:50.

6. A magnetic recording medium as claimed in claim 1, wherein the weight ratio of the (c) polyisocyanate compound to the sum of the (a) carboxyl-containing vinyl chloride/vinyl acetate copolymer and (b) polyurethane resin is within the range of from 40:60 to 10:90.

* * * * *